United States Patent
Preston et al.

(10) Patent No.: US 9,292,017 B2
(45) Date of Patent: Mar. 22, 2016

(54) SYSTEM AND METHOD FOR REAL-TIME GUIDANCE AND MAPPING OF A TUNNEL BORING MACHINE AND TUNNEL

(71) Applicants: Dan Alan Preston, Bainbridge Island, WA (US); Joseph David Preston, Bainbridge Island, WA (US); Marc A. Derenburger, Bremerton, WA (US); Carin L. Douglass, Silverdale, WA (US); Paul M. Peterson, Bremerton, WA (US); Kyle A. Yeats, Port Orchard, WA (US)

(72) Inventors: Dan Alan Preston, Bainbridge Island, WA (US); Joseph David Preston, Bainbridge Island, WA (US); Marc A. Derenburger, Bremerton, WA (US); Carin L. Douglass, Silverdale, WA (US); Paul M. Peterson, Bremerton, WA (US); Kyle A. Yeats, Port Orchard, WA (US)

( * ) Notice: Subject to any disclaimer, the term of this patent is extended or adjusted under 35 U.S.C. 154(b) by 0 days.

(21) Appl. No.: 14/257,873

(22) Filed: Apr. 21, 2014

(65) Prior Publication Data

US 2015/0301533 A1 Oct. 22, 2015

Related U.S. Application Data

(60) Provisional application No. 61/814,570, filed on Apr. 22, 2013.

(51) Int. Cl.
*G06F 7/70* (2006.01)
*G05D 1/02* (2006.01)

(52) U.S. Cl.
CPC .............. *G05D 1/0212* (2013.01); *G05D 1/028* (2013.01); *G05D 1/0236* (2013.01)

(58) Field of Classification Search
None
See application file for complete search history.

(56) References Cited

U.S. PATENT DOCUMENTS

| | | | |
|---|---|---|---|
| 2008/0027591 A1* | 1/2008 | Lenser et al. | 701/2 |
| 2008/0183825 A1* | 7/2008 | Alicherry et al. | 709/206 |
| 2008/0270017 A1* | 10/2008 | Saks | 701/200 |
| 2009/0043439 A1* | 2/2009 | Barfoot et al. | 701/25 |
| 2013/0338915 A1* | 12/2013 | Mizuochi et al. | 701/500 |

* cited by examiner

*Primary Examiner* — Adam Alharbi

(57) ABSTRACT

A system and methods are disclosed for providing the location of a tunnel boring machine (TBM) by establishing of a plurality of known locations or "monuments"; from these monuments located at least on, over or within the TBM's start point, known in the art as a "pit". The present invention provides among other things an integrated navigation system that provides real-time parametric guidance information to the TBM, relative to the tunnel origin, past course and current trajectory, while simultaneously employing a non-contact measuring system in concert with said origin and course information for the final provision of an as-built map of tunnel dimensions and centerline.

3 Claims, 17 Drawing Sheets

SYSTEM AND METHOD FOR REAL-TIME GUIDANCE AND MAPPING OF A TUNNEL BORING MACHINE AND TUNNEL

INVENTORS

| Dan Alan Preston | US Citizen | US Resident | Bainbridge Island, WA |
| --- | --- | --- | --- |
| Joseph David Preston | US Citizen | US Resident | Bainbridge Island, WA |
| Marc A. Derenburger | US Citizen | US Resident | Bremerton, WA |
| Carin L. Douglass | US Citizen | US Resident | Silverdale, WA |
| Paul M. Peterson | US Citizen | US Resident | Bremerton, WA |
| Kyle A. Yeats | US Citizen | US Resident | Port Orchard, WA |

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

FIELD OF THE INVENTION

This invention generally relates to the establishment of a plurality of known locations known in the art as "monuments"; from these monuments located at least on, over, or within the tunnel boring machine's (TBM) start point, known in the art as a "launch start". The present invention provides among other things an integrated navigation system that provides real-time parametric guidance information to the TBM, relative to the tunnel origin, past course and current trajectory, while simultaneously employing a non-contact measuring system in concert with said origin and course information for the final provision of an as-built map of tunnel dimensions and centerline.

BACKGROUND OF THE INVENTION

Tunnel boring machines (TBM) are used to excavate circular cross section tunnels through a variety of soil and rock strata. As tunnels are bored regardless of geology, it is imperative the TBM and resulting excavating tunnel stay on the design alignment within the mandated tolerances. It may be very costly if 1. The tunnel veers off alignment wandering outside of the client's purchased Right-of-Way (ROW), 2. The TBM encounters unanticipated geological features or utilities in urban settings, or 3. The tunnel alignment and correction curves exceed the tight tolerances required for sustaining the dynamic envelope of train tunnels and highway tunnels. In order to avoid negative impacts on the TBM, the tunnel surroundings, or underground utilities, it is imperative that TBM be precisely locatable and guided when boring through the earth.

In addition to the need for precise navigation of the TBM, the tunnel itself must be mapped. The need for mapping in tunnels is twofold. Firstly, an as-built map of the tunnel is needed to compare finished tunnel dimensions to plan requirements. Secondly, the as-built map can be maintained after the tunnel is completed and used as a baseline measurement for reference during subsequent surveys to observe changes in tunnel geometry over time.

The present methods of TBM guidance primarily use lasers and conventional surveying techniques. Lasers and transit theodolites, originating from the tunnel entrance, are relayed through a network of fixed monuments on the tunnel walls and used to identify the position and attitude of the TBM relative to the desired design location. The precision in identifying the exact location (Northing, Easting, Elevation) of this progressive series of monuments and their growing error as the tunnel extends can lead to improper alignment of the tunnel or missing the end target within the stipulated tolerance. This conventional system using sighted theodolites to advance the monuments used by the laser guidance systems is often adversely affected by error inherent to accuracy of the measuring instruments, light refraction, angle of incidence, and reception. From the final measured monument near the TBM, a servo theodolite with distance measuring capability, along with inclinometers on the TBM, are used to identify the axis of the TBM as well as monitor TBM pitch (up and down), yaw, and rotation depending on their installation orientation. The theodolite locates and reports to the underlying guidance computer prisms attached to the TBM with a known orientation and location relative to the reference frame of the TBM. The motorized station can measure their location as the TBM bores the tunnel. The output from the inclinometers and updated target locations is relayed to a central processing unit which outlines the path for the TBM. Monitoring of TBM vertical alignment is derived from the same methods of angle and distance measurement. The series of monuments affixed to the tunnel wall as the TBM advances is measured for elevation using wire line water level instruments to minimize the accumulation of error relative to elevation. Gyroscopes may also be used to monitor the yaw of the TBM, verified by a surveyor.

The present state of tunnel mapping utilizes a two-step method. Firstly, the mapping positions are precisely located in reference to a known point outside of the tunnel. This is accomplished using a theodolite measurement device. If the tunnel curves, mirrors are used to reflect the beam, and the mirrors' locations are measured by the laser measurement device. Each of these mirrors induces additional error in the final measurement of the mapping positions. With the location and orientation of the mapping stations known, the tunnel walls are then measured at several locations with respect to this position. These measurements are typically done using reflector-less laser measurement system; however, other touch-less measurement systems, such as Electronic Distance Measurements (EDM), may be used to measure the distance to the tunnel walls.

The process of establishing the mapping locations and obtaining measurement is repeated until the entire tunnel has been measured. The distance measurements are then associated with their respective locations to generate a three dimensional map of the tunnel. This process is costly, time-consuming, and labor-intensive, requiring cessation of any work and traffic in the tunnel until survey completion.

What is needed is an integrated navigation system that provides real-time parametric guidance information to the TBM, relative to the tunnel origin (hereinafter "the pit"), past course, and current trajectory, while simultaneously employing a non-contact measuring system in concert with said origin and course information for the final provision of an as-built map of tunnel dimensions and centerline. The pit is a known point within the earth-centered-earth fixed global positioning system (GPS), and at least one of GPS retransmission and time modulated wireless triangulation architectures provide availability of positioning signals in the otherwise unavailable underground environment of a newly excavated tunnel. As the TBM proceeds along its excavation heading, a vehicle such as a rubber wheeled vehicle or a locomotive delivers ring assemblies, fabricated on-site in the pit to support the recently excavated portion of the tunnel. The constrained curvilinear path, also known as the design centerline, from pit to TBM is regularly traversed by the locomotive which is, in current systems, employed for transport of ring assemblies and muckout.

DESCRIPTION OF RELATED ART

In a discussion of prior art, European patent application Ser. No. EP20010304645 filed May 25, 2001, titled SELF-CONTAINED MAPPING AND POSITIONING SYSTEM UTILIZING POINT CLOUD DATA generally describes a self-contained mapping and positioning system for underground mining that is capable of mapping the topography of a region, such as a mine tunnel, and further being able to use the mapped data to determine the position of an object, such as a mining vehicle, within the mine tunnel.

The method described in European patent application Ser. No. EP20010304645 provides only the position of the object, whereas the present invention incorporates positioning as well as automatic course correction as determined by a pre-established path. Furthermore, the present invention includes permanent monuments to be used in post-boring surveys to evaluate changes in tunnel geometry.

In a discussion of prior art, U.S. patent application Ser. No. 08/304,858 filed Sep. 13, 1994, titled GUIDANCE SYSTEM AND METHOD FOR KEEPING A TUNNEL BORING MACHINE CONTINUOUSLY ON A PLAN LINE generally describes a guidance system and method for keeping a TBM continuously on a plan line. The guidance system requires no machine operator calculations and provides the boring machine operator with a graphic display of past, present, and projected positions of the boring machine from a horizontal and vertical perspective. The system uses a laser beam transmitter placed to the rear of the TBM along with a front opaque target with a horizontal and vertical cross-hair and a rear transparent target with a horizontal and vertical cross-hair. The front and rear targets are disposed on the front and the rear of the boring machine. Also, an on-board programmable computer is installed on the boring machine for imputing data as to horizontal offset and vertical offset readings from the front and rear targets as the boring machine advances forward. Typically the boring machine moves forward in increments of four feet with offset readings taken by the operator after each increment. The offsets are measured in feet up to two decimal places with the readings based on measured positions being wither right or left of the vertical cross-hair and above or below the horizontal cross-hair of the front and rear targets. Further, the on-board computer is programmed to store and provide a laser alignment check for verifying laser setup information and to graphically display alignment errors during a change in the setup of the laser beam transmitter by a survey crew.

The device described in U.S. patent application Ser. No. 08/304,858 employs a series of lasers to project the path which are prone to error inherent to light refraction, angle of incidence, and reception. The present invention provides the TBM with data via the locomotive, combined with an on-board INS to provide the TBM with the current orientation, direction, and position to compile the projected path and compare with the desired path.

In a discussion of prior art, U.S. Pat. No. 3,498,673 filed Feb. 19, 1968, titled MACHINE GUIDANCE SYSTEM AND METHOD generally describes a TBM disposed within a tunnel and provided with a guidance system comprising a laser projection unit fixedly supported by a wall of the tunnel and directing its beam onto a mirror-like reflector mounted on the machine, whereby the reflector provides a reflection of the beam on a target also mounted on the machine. The tunnel boring apparatus is steered to maintain the reflection at a predetermined location on the target.

The method described in U.S. Pat. No. 3,498,673 aligns external lasers with the desired path and is sent through the TBM which is steered such that the TBM keeps the laser within a designated area. Laser guidance systems are prone to error inherent to light refraction, angle of incidence, and reception. The present invention utilizes a locomotive with an INS to position the TBM continuously; this position is then compared to the desired path as programmed into the TBM to provide the TBM with a path that needs to be followed to match the desired path.

In a discussion of prior art, European patent application Ser. No. EP20030250157 filed Jan. 10, 2003, titled METHOD AND APPARATUS FOR SURVEYING THE GEOMETRY OF TUNNELS generally describes a method and apparatus for surveying the geometry of tunnels comprising measuring the position of a tunnel surface relative to an absolute three-dimensional coordinate system, using at least one reflector-less distance sensor mounted for orientation in three dimensions and calculating a deviation from a pre-defined geometry for the surface and displaying said deviation in real time.

The method and apparatus described in European patent application Ser. No. EP20030250157 is well suited to the mapping of tunnels as well as post-boring surveys for maintenance of the tunnel but is not well suited for as-built mapping during the tunneling process. The present invention utilizes permanent monuments for long-term tunnel mapping, utilizes an INS system that is integrated with the self-contained mapping system, and communicates the combined parametric information to the TBM to provide navigational guidance for the TBM.

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

U.S. Pat. No. 6,707,424 Integrated Positioning System and Method

U.S. Pat. No. 8,417,490 System and Method for the Configuration of an Automotive Vehicle with Modeled Sensors Inertial Navigation, by Kevin J. Walchko, University of Florida, Gainesville, Fla., and Dr. Paul A. C. Mason, NASA Goddard Space Flight Center, Greenbelt Md. Published 2002.

Real-Time Tunnel Boring Machine Monitoring: A State of the Art Review, by Michael A. Mooney, Bryan Walter, Christian Frenzel. Colorado School of Mines, Golden Co. Published 2012

Design and Field Testing of an Autonomous Underground Training System, by Joshua A. Marshall and Timothy D. Barfoot. Published Dec. 13, 2007

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

SUMMARY OF THE INVENTION

Although the best understanding of the present invention will be had from a thorough reading of the specification and claims presented below, this summary is provided in order to acquaint the reader with some of the new and useful features of the present invention. Of course, this summary is not intended to be a complete litany of all of the features of the present invention, nor is it intended in any way to limit the breadth of the claims, which are presented at the end of the detailed description of this application.

The present invention employs the regular traverse of the locomotive between the pit and the TBM as the method for accumulation of parametric guidance information to the TBM, relative to the tunnel origin, past course, and current trajectory; the means of transmission of said information to the TBM for navigation; and the means by which a non-contact measuring system is deployed in concert with said origin and course information for the final provision of an as-built map of tunnel dimensions and centerline.

To implement the present invention, an integrated system of devices is installed in the pit, on the locomotive, on the TBM, and on the tunnel ring assemblies. Installed in the pit are GPS receivers and GPS re-transmitters. Installed on the locomotive are GPS receivers for the retransmitted signals within the pit, a fault-tolerant inertial navigation system (FT-INS) that obtains course information, a self-contained mapping system, a central processing unit (CPU), and a wireless transmitter for information transfer to and from the TBM. Installed on the TBM are a transceiver to receive transmitted origin and course information, a microprocessor and attitude heading reference system (AHRS) for calculation of heading, and various input/output devices. Included in the present invention are permanent monuments affixed to tunnel ring assemblies which are utilized in concert with the aforementioned self-contained mapping system installed on the locomotive, as well as being available for post-boring surveys of tunnel geometry.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently preferred embodiments of the invention are illustrated in the accompanying drawings, in which.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In the following examples of the illustrated embodiments, references are made to the accompanying drawings which form a part hereof, and in which is shown by way of illustration various embodiments in which the invention may be practiced. It is to be understood that other embodiments may be utilized and structural and functional changes may be made without departing from the scope of the invention.

Figure 1:
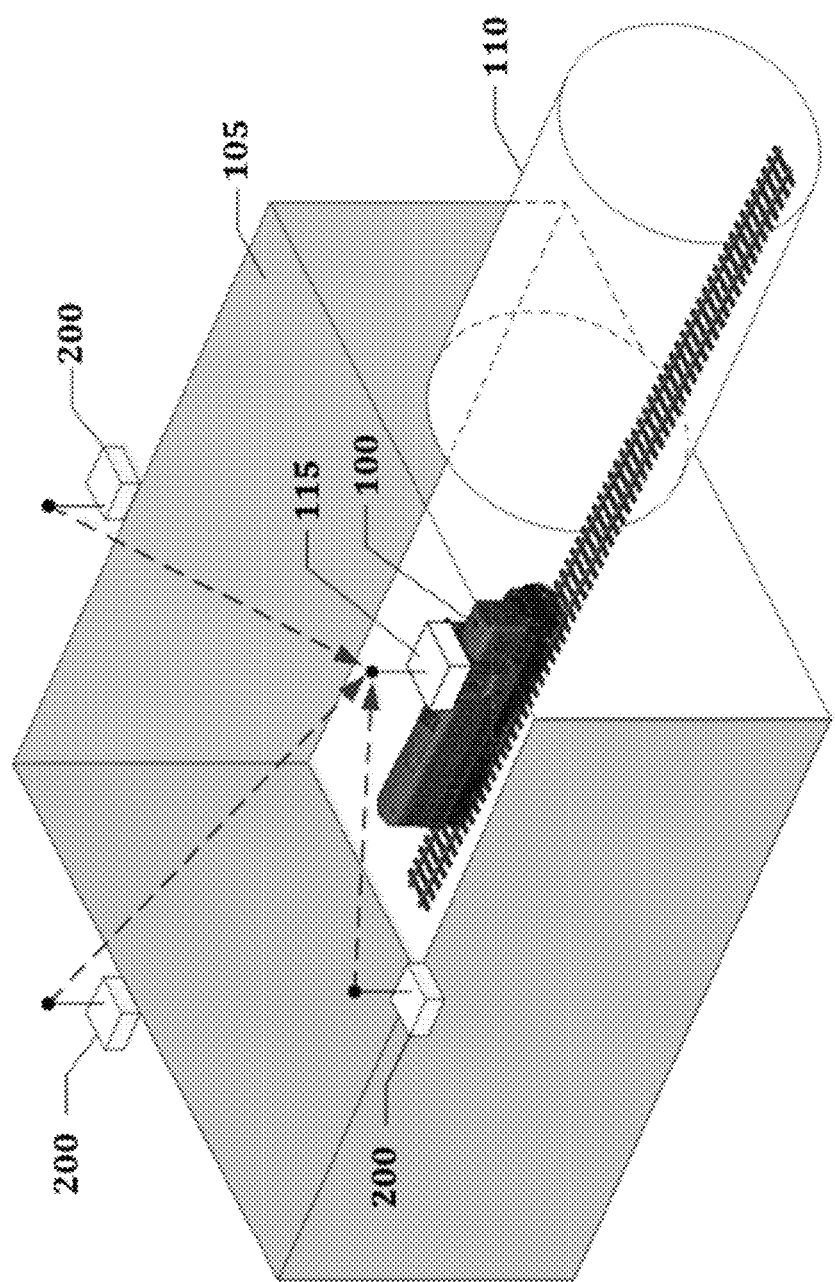
FIG. 1 is a perspective view of the locomotive in the launch pit according to the preferred embodiment of the present invention, depicting the physical method for the accumulation of locomotive initial geo-location data at the launch pit and the retransmission of said data to the locomotive.

FIG. 1 illustrates the preferred embodiment of the physical method for the accumulation of locomotive initial geo-location data within the launch pit 105 and the retransmission of said data to the locomotive 100. The locomotive 100 starts and ends each travel cycle through the tunnel 110 in the launch pit 105. Surrounding the launch pit 105 are three or more geo-location and retransmission devices 200. A locomotive mounted transceiver 115 receives and transmits the position data 225 (FIG. 2).

Figure 2:
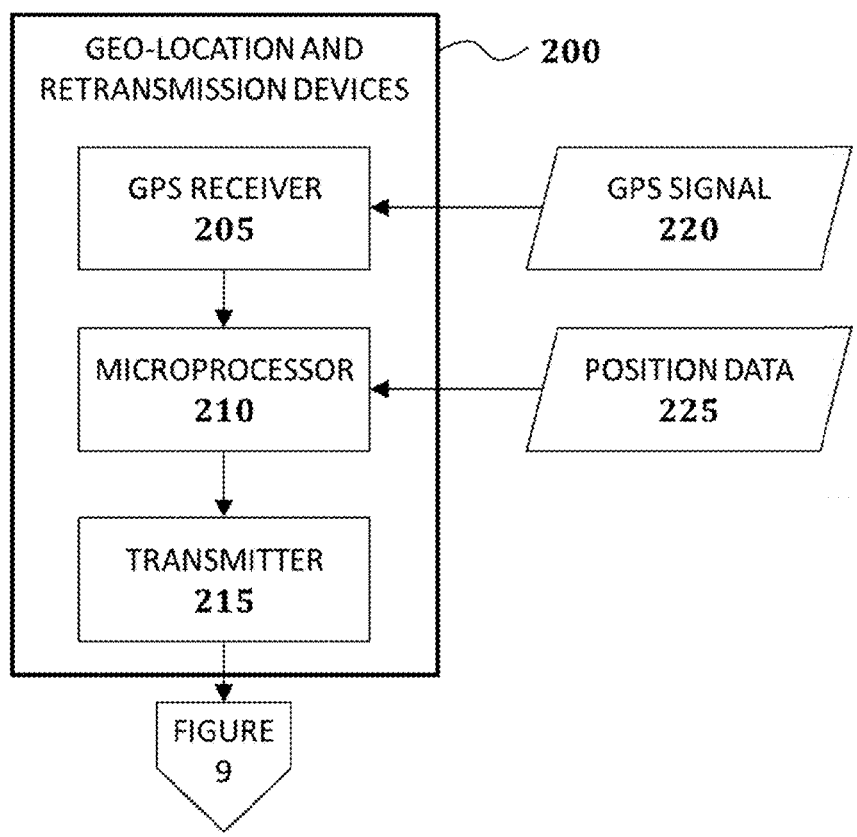
FIG. 2 is a block diagram of the components contained within FIG. 1.

FIG. 2 describes the components illustrated in FIG. 1. The geo-location and retransmission devices 200 each contain at least one global positioning system (GPS) receiver 205, microprocessor 210, and transmitter 215. These devices 200, well known in the art of position determination and land survey techniques, are designed to receive a GPS signal 220 by which position data 225 is determined and relayed to a locomotive mounted transceiver 115 (FIG. 1).

These commercially available systems utilize two positioning and navigation systems in a single unit, the first is used within sight of earth-orbiting Global Navigation Satellite System (GNSS) satellites and the second in less than optimal GNSS locations. The locomotive 100 (FIG. 1) in the launch pit 105 (FIG. 1) will generally not be in line-of-sight of the earth-orbiting satellites. The locomotive mounted transceiver 115 (FIG. 1) receives transmissions from a group of at least three ground-based beacons stationed at precise known locations, each of which transmits a distinct signal, including location information. The means of data transmission may include wireless protocols such as 802.11g, Bluetooth, time modulated ultra-wide band (TM-UWB) or other such wireless methods as may arise with developing technologies.

Figure 3:
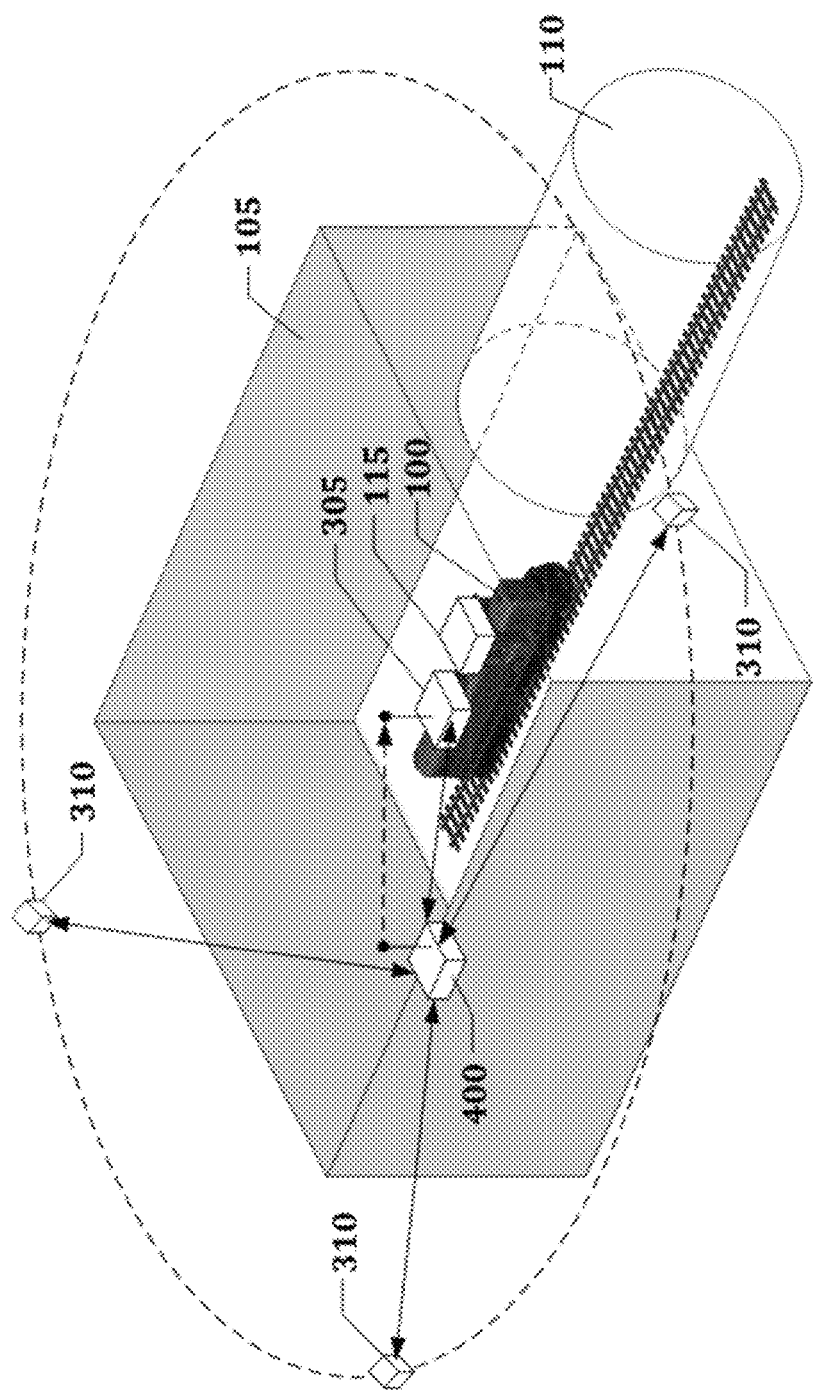
FIG. 3 depicts an alternate embodiment using a robotic total survey station mounted in the launch pit and a system of survey reflectors.
Figure 4:
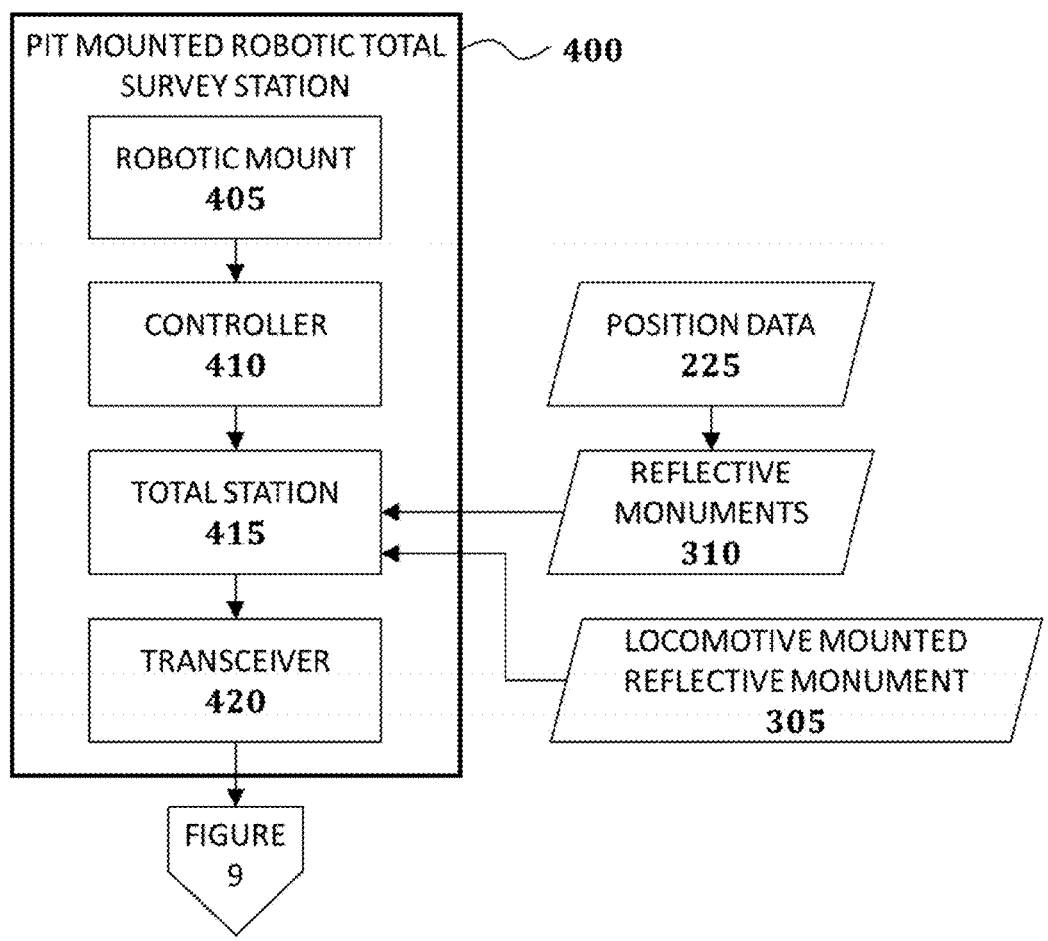
FIG. 4 is a block diagram depicting the components within FIG. 3 which provide for the accumulation and transmission of initial geo-location data.

Another embodiment of the present invention, illustrated in FIG. 3 and described by FIG. 4, uses a pit mounted robotic total survey station 400 comprising a robotic mount 405, a controller 410, and a total station 415 (similar in method and construction to the Trimble Series 6), and a survey station transceiver 420. The pit mounted robotic total survey station 400 is mounted along the perimeter of the launch pit 105 where it utilizes reflective monuments 310 outside of the launch pit 105 to determine its geo-location. A locomotive mounted reflective monument 305 is used to determine the location of the locomotive 100 relative to the known reflective monuments 310. The survey station transceiver 420 contained within the pit mounted robotic total survey station 400 transmits position data 225 to the survey station transceiver 420 on the locomotive 100.

Figure 5:
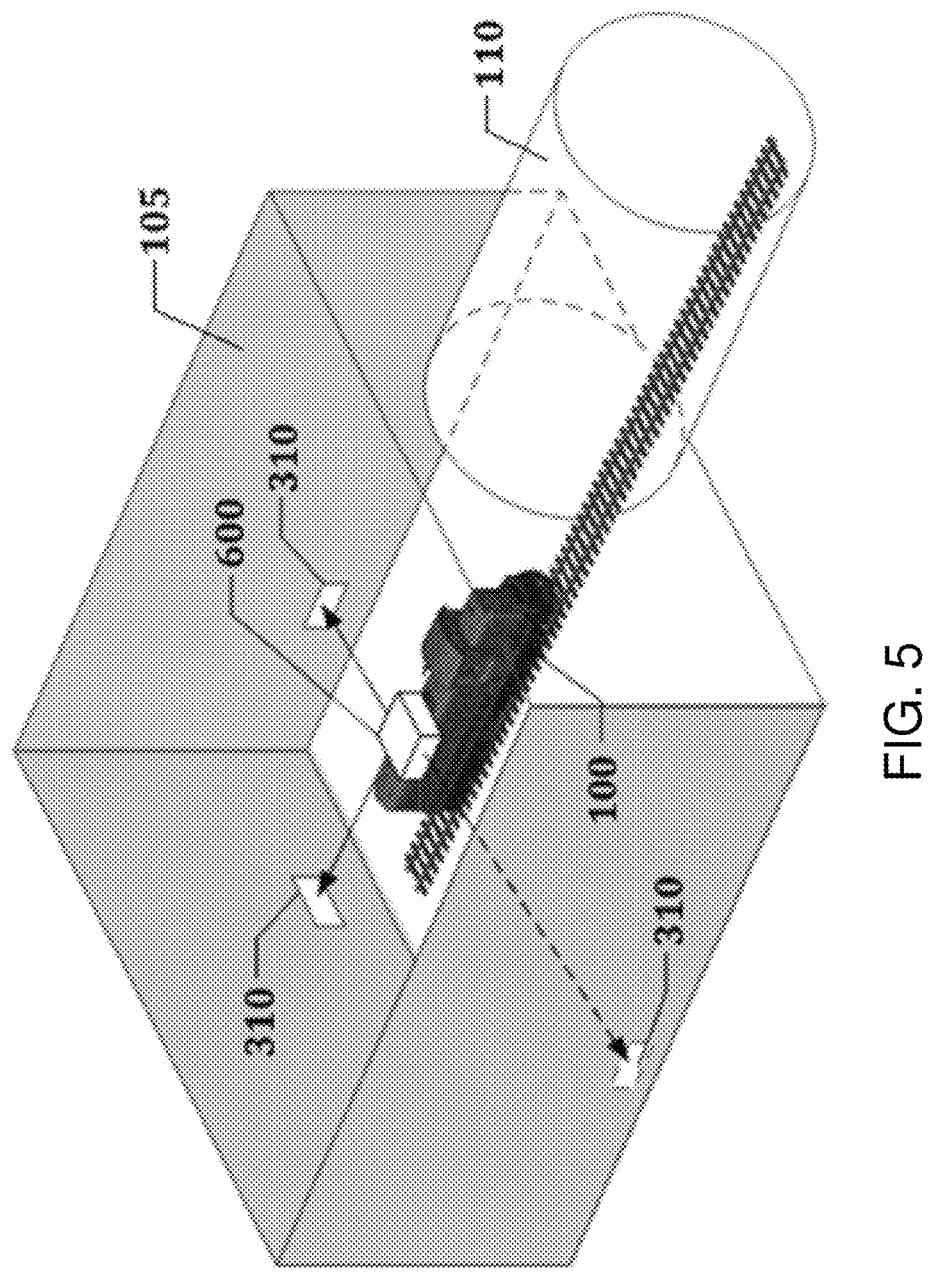
FIG. 5 depicts an alternate embodiment using a robotic total survey station mounted on the locomotive and a system of survey reflectors in the launch pit.
Figure 6:
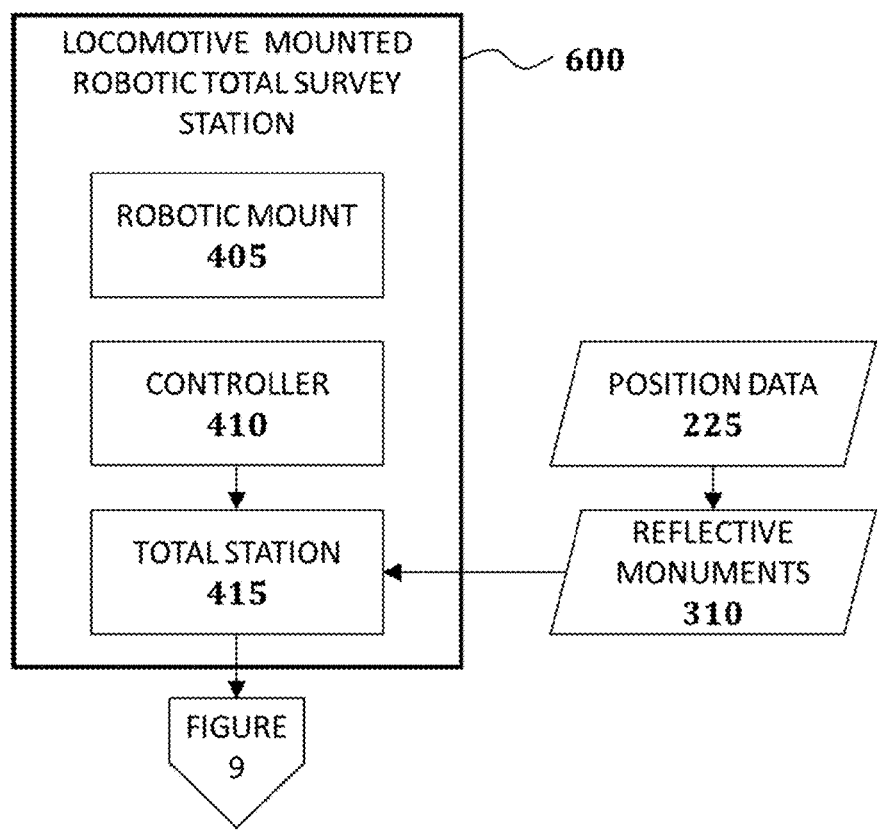
FIG. 6 is a block diagram depicting the components contained within FIG. 5 which provide for the accumulation and transmission of initial geo-location data.
Figure 9:
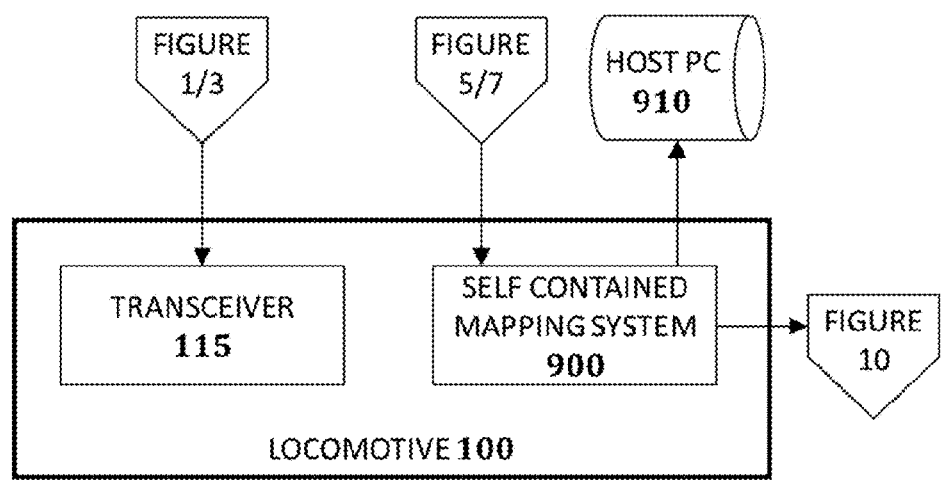
FIG. 9 is a block diagram of the components contained within the locomotive.

According to yet another embodiment of the present invention, illustrated in FIG. 5 and described by FIG. 6, a locomotive mounted robotic total survey station 600, comprising a robotic mount 405, a controller 410, and total station 415. Within the method described by this embodiment, the locomotive mounted robotic total survey station 600 obtains the position of the locomotive 100 by triangulation with at least three reflective monuments 310 at surveyed locations within the launch pit 105. As depicted in FIG. 9, the locomotive mounted transceiver 115 is bypassed with this embodiment and position data 225 is direct fed to self-contained mapping system (SCMS) 900 (FIG. 9) onboard the locomotive 100.

Figure 7:
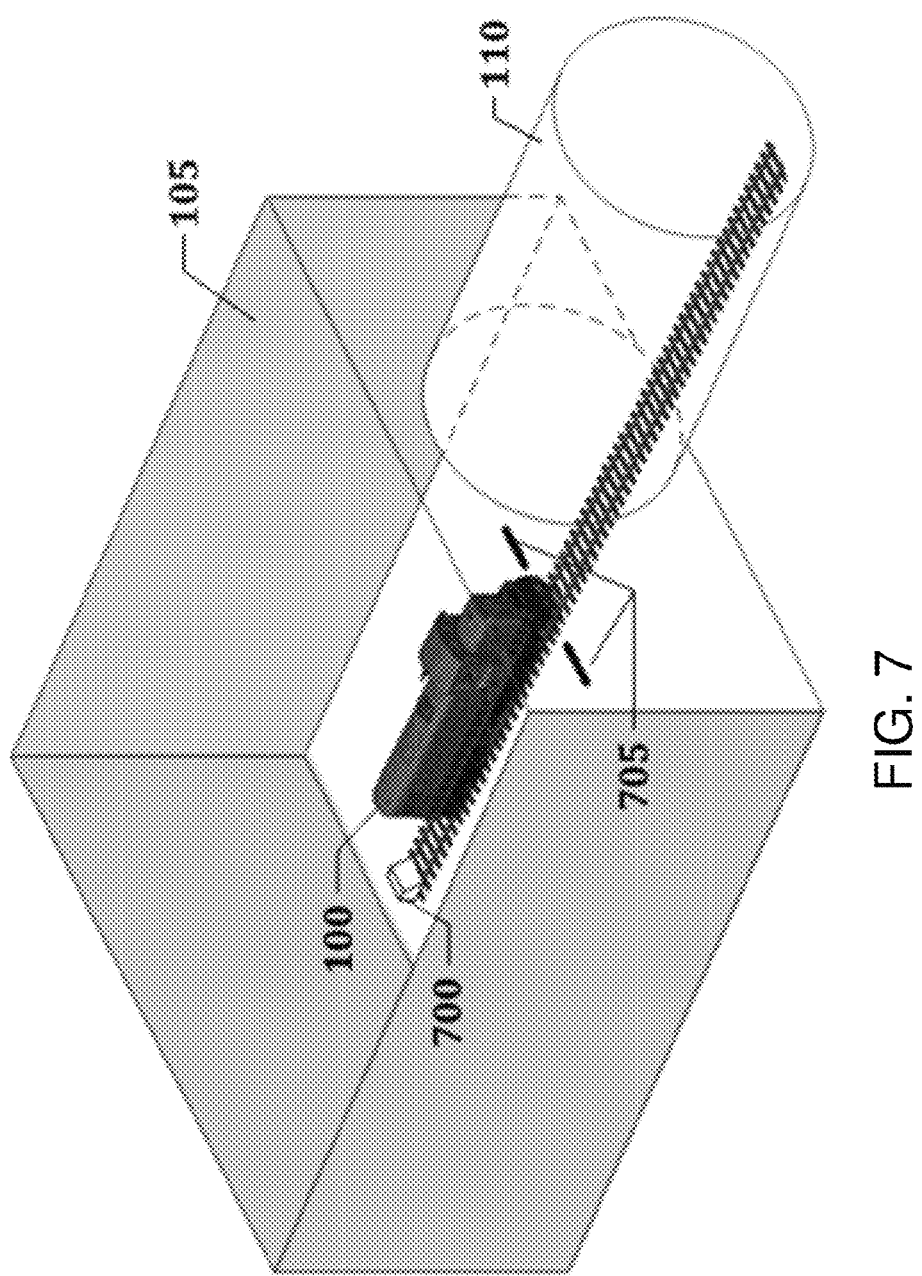
FIG. 7 depicts an alternate embodiment using a docking station and alignment marks at surveyed locations within the launch pit.
Figure 8:
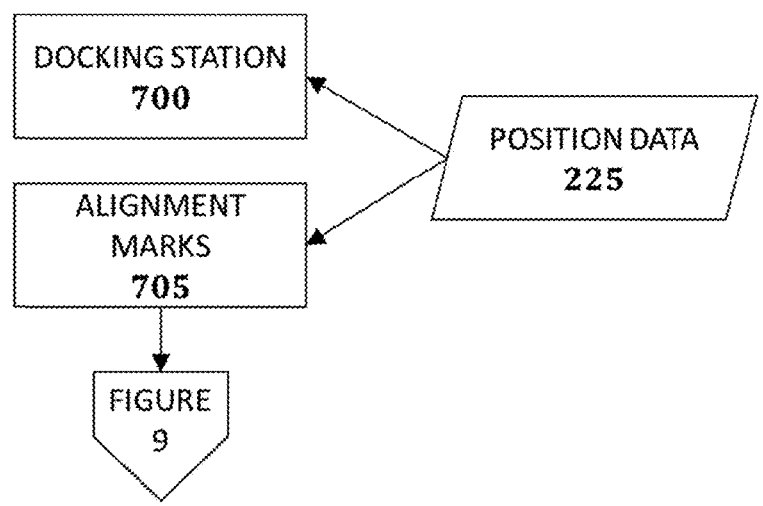
FIG. 8 is a block diagram depicting the components contained within FIG. 7 which provide for the accumulation and transmission of initial geo-location data.

A less technical yet viable alternative embodiment of the present invention is illustrated in FIG. 7 and described by FIG. 8, wherein the locomotive 100 stops at a fixed docking station 700 installed at the terminal point of the track in the pit 105. Alignment marks 705 may also be utilized in this embodiment either independently or in concert with the fixed docking station 700 to establish position data 225. The surveyed origin point established by the docking station 700 is a direct input to central processing unit one (CPU1) 1520 (FIG. 15) onboard the SCMS 900 (FIG. 9), offsets to the inertial navigation system (INS) are calculated and the INS is updated to the current position and time of position.

Figure 10:
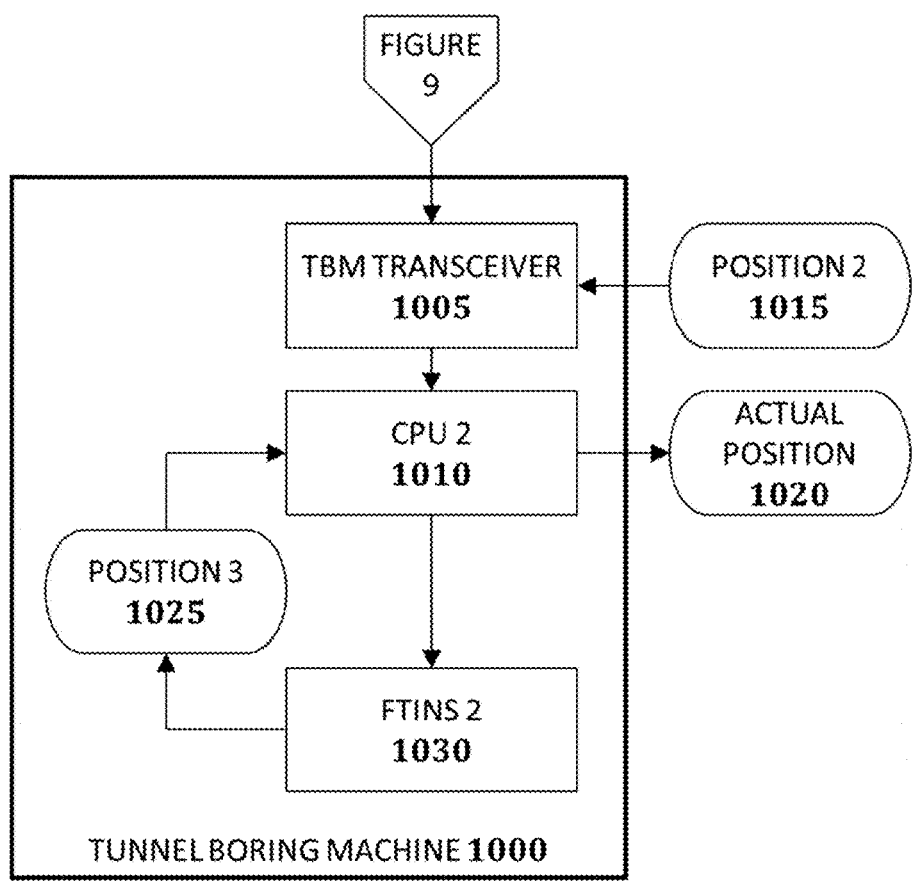
FIG. 10 is a block diagram illustrating the components contained within the TBM.
Figure 15:
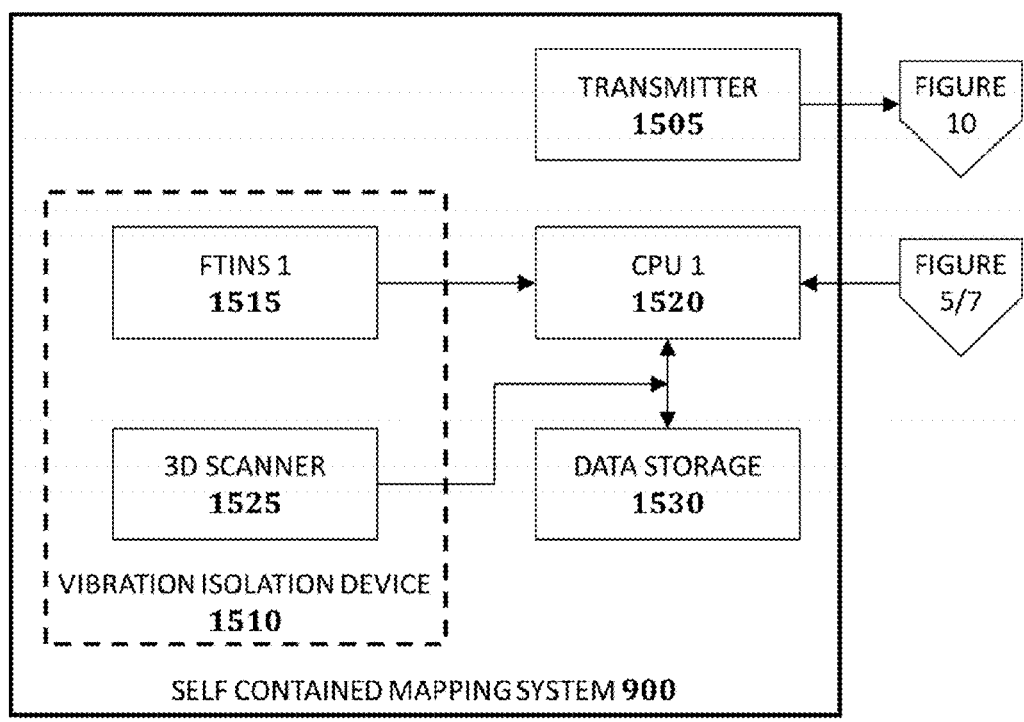
FIG. 15 is a block diagram illustrating the components utilized for the self-contained mapping system.

Referring now to FIG. 9, there is illustrated an embodiment of the present invention describing the componentry mounted on and within the body of the locomotive 100 for the gathering and storage of information related to the guidance of the TBM 1000 (FIG. 10) and the mapping of the tunnel 110 (FIGS. 1, 3, 5, 7). Within the preferred embodiment of FIG. 1 and the alternate embodiment of FIG. 3, a locomotive mounted transceiver 115 establishes a link by which position data 225 (FIGS. 2, 4, 6, and 8) is transferred to and received by CPU1 1520 (FIG. 15). In the case of the alternate embodiments of FIGS. 5 and 7, initial position data is directly provided to CPU1 1520 (FIG. 15). In each of the described embodiments, the position data 225 (FIGS. 2, 4, 6, and 8) from the SCMS 900 is utilized to either initialize or recalibrate fault tolerant inertial navigation system one (FTINS1) 1515 (FIG. 15) such that a point of origin, also known as initial position, within the launch pit (Position 1) is calculated. Data is transmitted from CPU1 920 via SCMS transmitter 1505 (FIG. 15) to the host PC 910 and to the TBM 1000 (FIG. 10). The data transmitted to the host PC 910 may be stored on internet based storage.

Referring now to FIG. 10, the docking process 1135 (FIG. 11) within an embodiment of the present invention establishes the actual position 1020 relative to the locomotive 100 (FIGS. 1, 2, 3, and 7), which is both necessary and sufficient to characterize the actual underground location of the TBM 1000. Central processing unit 2 (CPU2) 1010 receives updated position information (Position 2) 1015 from CPU1 1520 (FIG. 15) through TBM transceiver 1005. The TBM 1000 obtains the presumed position (Position 3) 1025 from FTINS2 1030 based on movement of the TBM 1000 (element 1200). CPU2 1010 calculates the difference between the updated position information (Position 2) 1015 and the presumed position (Position 3) 1025 (element 1205), and the difference is applied as a correction to the Position 3 1025 data in FTINS2 1030 (element 1210).

Figure 11:
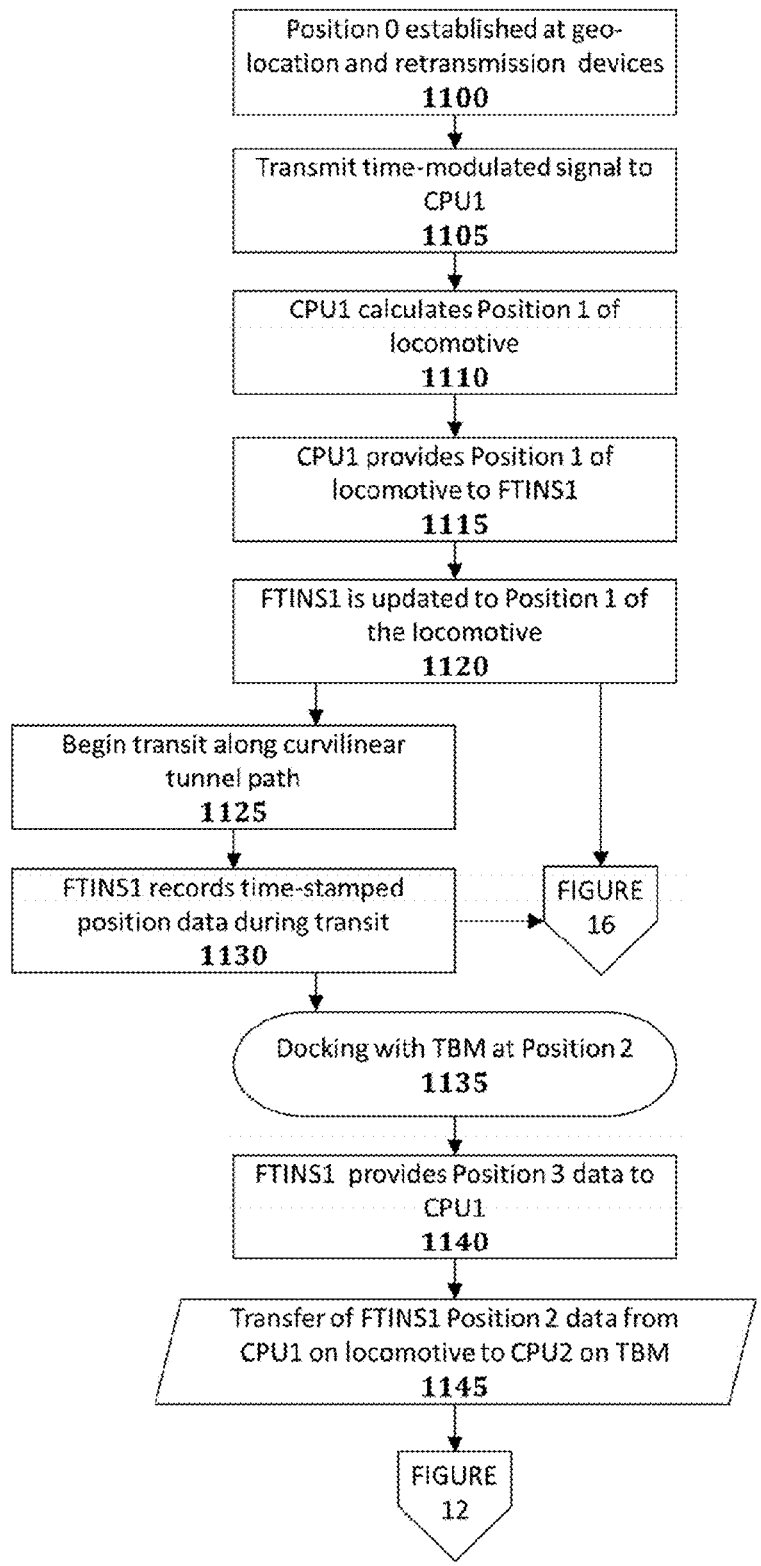
FIG. 11 depicts the process elements associated with the utilization of geo-location input data.

FIG. 11 depicts the process elements associated with the utilization of position input data provided by the componentry depicted in FIG. 1, the interaction of componentry depicted in FIG. 9 as the locomotive 100 transits the curvilinear tunnel path 1125, and the transmission of accumulated data to the TBM 1000 componentry of FIG. 10. Initial Position 0 is established at the geo-location and retransmission devices 200 (element 1100). The time modulated signal with Position 0 data is then transmitted to CPU1 1520 (FIG. 15) onboard the locomotive 100 (element 1105). CPU1 1520 (FIG. 15) calculates initial position of the locomotive 100 (Position 1 1400) (element 1110). The Position 1 1400 data is then provided to FTINS1 1515 (FIG. 15) (element 1115). FTINS1 1515 (FIG. 15) is then updated to Position 1 1400 (element 1120).

Two processes occur as the locomotive 100 (FIGS. 1, 3, 5, and 7) transits a curvilinear path 1120 through the tunnel 110 (FIGS. 1, 3, 5, and 7) from the launch pit 105 (FIGS. 1, 3, 5, and 7) to the TBM 1000 (FIG. 10). The first process is the establishment of guidance information for the TBM 1000 (FIG. 10) by the delivery of a position update to the FTINS2 1030 (FIG. 10). The second process is the active mapping of the tunnel 110 (FIGS. 1, 3, 5, and 7) as-built, accomplished by the measurement of distance to the tunnel walls 1130 by a SCMS 900 (FIGS. 9 and 15). These processes may be accomplished simultaneously during the transit from launch pit 105 (FIGS. 1, 3, 5, and 7) to docking with the TBM at Position 2 1135 or separately so as to focus on delivery of position data to the TBM 1000 (FIG. 10) on the incoming trip and to focus on tunnel mapping on the outgoing trip.

Within these two processes, whether simultaneous or separate, information from FTINS1 1515 (FIG. 15) and the SCMS 900 (FIGS. 9 and 14) is provided to CPU1 1520 (FIG. 15), which compiles the aforementioned data with the initial position data 1120. Upon docking 1135 with the TBM 1000 (FIG. 10), the FTINS microprocessor 1320 (FIG. 13) calculates the actual position and provides this data to the onboard CPU1 1520 (FIG. 15) (element 1140). The docking process 1135 establishes actual position relative to the locomotive 100 (FIGS. 1, 3, 5, and 7) and the TBM 1000 (FIG. 10). All information relative to travel and tunnel measurement from the SCMS 900 (FIG. 9) is retained onboard the locomotive 100 (FIGS. 1, 3, 5, and 7) until its return to the launch pit 105 (FIGS. 1, 3, 5, and 7), where data collected in terms of TBM 1000 (FIG. 10) position and tunnel measurements are uploaded to the host PC 910 (FIG. 9) and may be backed up to internet-based data storage.

Figure 12:
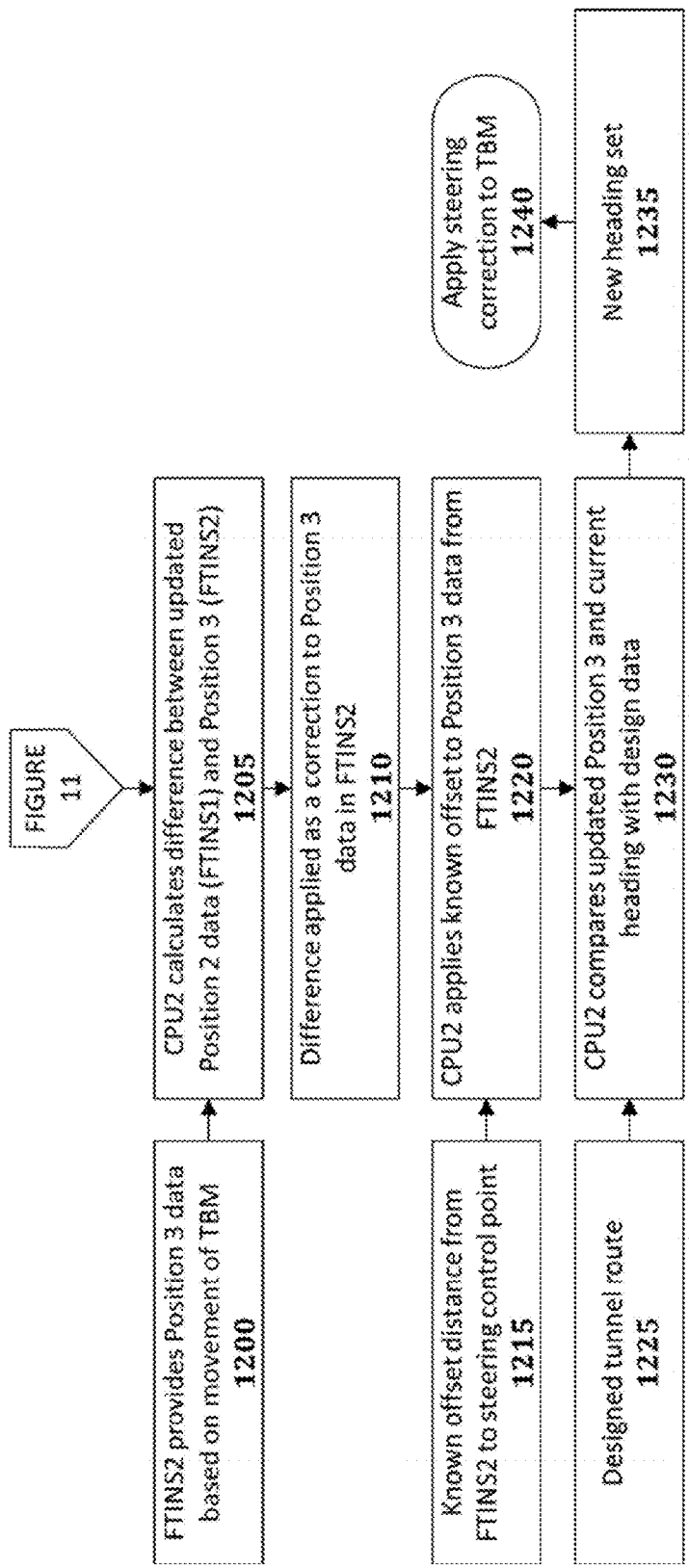
FIG. 12 depicts the process elements associated with the utilization of updated geo-location information.

Referring now to FIG. 12, the TBM 1000 (FIG. 10) obtains the presumed position (Position 3) 1025 (FIG. 10) from FTINS2 1030 (FIG. 10) based on movement of the TBM 1000 (FIG. 10) (element 1200). CPU2 1010 (FIG. 10) calculates the difference between the updated position information (Position 2) 1015 (FIG. 10) and the presumed position (Position 3) 1025 (FIG. 10) (element 1205), and the difference is applied as a correction to the Position 3 1025 (FIG. 10) data in FTINS2 1030 (FIG. 10) (element 1210). There is programmed within CPU2 1010 (FIG. 10) a known offset distance 1215 from FTINS2 1030 (FIG. 10) to the steering control point of the TBM 1000 (FIG. 10), and CPU2 1010 (FIG. 10) applies the aforementioned known offset to the Position 3 1025 (FIG. 10) data (element 1220) contained within FTINS2 1030 (FIG. 10). The designed tunnel route 1225 programmed within the read-only memory of CPU2 1010 (FIG. 10), and the as-designed tunnel route 1225 is now compared to the current position 1230. CPU2 1010 (FIG. 10) on the TBM 1000 (FIG. 10) now establishes a new immediate heading 1235 for the TBM 1000 (FIG. 10) to follow. This new heading is applied to a steering correction 1240 to the TBM 1000 (FIG. 10) for either a manual or automatic pilot to follow.

Figure 13:
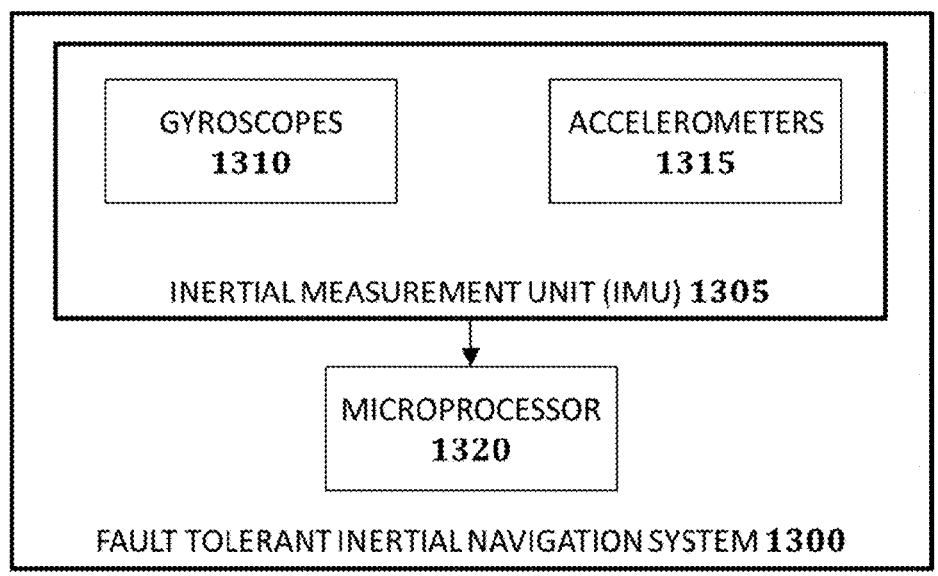
FIG. 13 is a block diagram illustrating the components contained within the fault tolerant inertial navigation system.

FIG. 13 depicts the components in the fault tolerant inertial navigation system (FTINS) 1300. Both the locomotive 100 (FIGS. 1, 3, 5, and 7) and the TBM 1000 (FIG. 10) are equipped with two inertial measurement units (IMUs) 1305 which include one or more angular rate sensors (gyroscopes) 1310 and one or more accelerometers 1315 which provide information to the FTINS microprocessor 1320. The output of the FTINS microprocessor 1320 describes the physical location of the locomotive 100 (FIGS. 1, 3, 5, and 7) relative to the known initial position data 225 (FIGS. 2, 4, 6, and 8), and the physical location of the TBM 1000 (FIG. 10) relative to its last position update.

Figure 14:
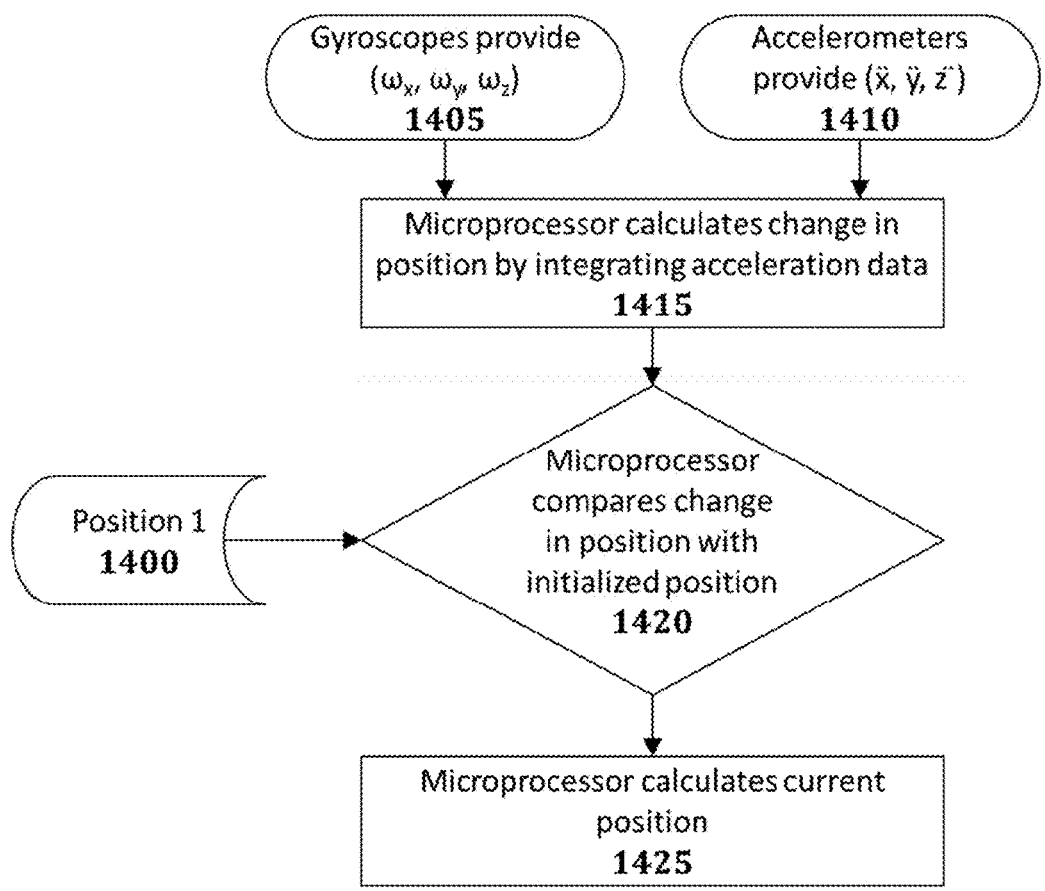
FIG. 14 depicts the process elements accomplished within the fault tolerant inertial navigation system componentry.

FIG. 14 depicts the process elements accomplished within the FTINS 1300 (FIG. 13) componentry. The gyroscopes provide ($\omega_x$, $\omega_y$, $\omega_z$) 1405 and the accelerometers provide ($\ddot{x}$, $\ddot{y}$, $\ddot{z}$) 1410 data. The FTINS microprocessor 1320 (FIG. 13) calculates change in position by integrating the acceleration data 1415. The FTINS microprocessor 1320 (FIG. 13) then receives the initialized position (Position 1) 1400 and compares it to the change in position 1420. The FTINS microprocessor 1320 (FIG. 13) finally calculates the current position 1425.

Referring now to FIG. 15, there is illustrated an embodiment of the present invention describing the self-contained mapping system (SCMS) 900 mounted within the locomotive 100 (FIGS. 1, 3, 5, and 7). The SCMS 900 uses a vibration isolation device 1510 and reflective monuments 310 installed on, or cast into, the tunnel walls to map the tunnels. The vibration isolation device 1510 comprises: FTINS1 1515; a contact-free 3D scanner 1525, such as a Light Detection and Ranging or Laser Imaging Detection and Ranging (LiDAR); CPU1 1520; a data storage unit 1530, such as a hard disk drive or a flash memory device; and a wired or wireless transmitter 1505. The SCMS 900 is capable of generating a 3D map of the tunnel 110 (FIGS. 1, 3, 5, and 7) during and after the tunnel boring process, generating an accurate measurement of the tunnel centerline, and, through the use of the reflective monuments 310 (FIGS. 3, 4, 5, and 6), the SCMS 900 may be used to observe the movement of fixed points on the tunnel wall during and after the tunnel boring process to determine change in tunnel geometry over time.

Figure 16:
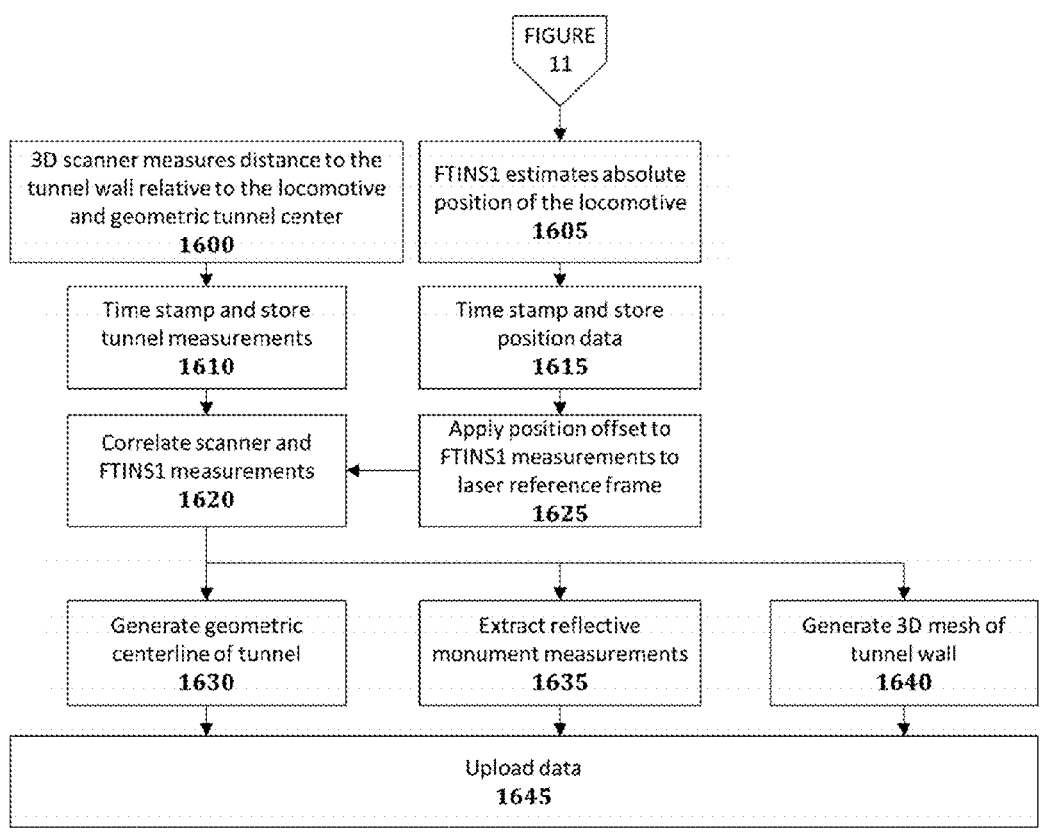
FIG. 16 depicts the process elements accomplished by the self-contained mapping system.

FIG. 16 depicts the process elements accomplished by the SCMS 900 (FIGS. 9 and 15). The SCMS 900 (FIGS. 9 and 15) applies a position offset to the FTINS1 1515 (FIG. 15) measurements in order to match the FTINS1 1515 (FIG. 15) reference frame with that of the 3D scanner 935 (FIGS. 9 and 15). The SCMS 900 (FIGS. 9 and 15) then measure the distance to the tunnel wall relative to the locomotive 100 (FIGS. 1, 3, 5, and 7) and geometric tunnel center 1600. The FTINS1 1515 (FIG. 15) estimates the absolute position of the locomotive 100 (FIGS. 1, 3, 5, and 7) (element 1605). Timestamps 1610, 1615 are applied to the two measurements and the data is stored. A position offset to the FTINS1 1515 (FIG. 15) is applied to the laser reference frame 1625. The data resulting from 1610 and 1625 is then correlated 1620 and used to: generate the geometric centerline of the tunnel 1630, extract reflective monument measurements 1635, and generate a 3D mesh of the tunnel wall 1640. The position of the reflective monuments 310 (FIGS. 3, 4, 5, and 6) can be extracted 1635 by isolating measurements from the 3D scanner 1525 (FIG. 15) which indicate a higher reflectivity, and individual reflective monuments can be identified by their specific reflectivity. Upon completing the trip through the tunnel, the SCMS 900 (FIGS. 9 and 15) uploads the measurements from the FTINS1 1515 (FIG. 15) and 3D scanner 1525 (FIG. 15) to an external computer via wired or wireless link 1645 for analysis of the as-built tunnel geometry.

Multi-Sensor Data Fusion:

Those skilled in the art of state estimation, robotics, and advanced defense avionics understand academically that sensor-fusion is the art of combining sensory data or data derived from disparate sources such that the resulting information is in some sense "better" than would be possible when these sources were used individually. This process is predicated on the covariance (or the measure of how much two variables vary together) of non-independent sources. The term "better" in the case above can mean more accurate, more complete, more dependable, or refer to the result of an emerging view or state estimation.

The data sources for a fusion process are not specified to originate from identical sources or sensors which may or may not be spatially and temporally aligned. Further one can distinguish direct fusion, indirect fusion, and fusion of the outputs of the former two. Direct fusion is the fusion of sensor data from a set of heterogeneous or homogeneous sensors, soft sensors, and history values of sensor data, while indirect fusion uses information sources like a prior knowledge about the environment and human input. Sensor fusion is also known as "multi-sensor data fusion" and is a subset of information fusion through an implementation of the probability theory.

Probability theory is the mathematical study of phenomena characterized by randomness or uncertainty. More precisely, probability is used for modeling situations when the result of a measurement, realized under the same circumstances, produces different results. Mathematicians and actuaries think of probabilities as numbers in the closed interval from 0 to 1 assigned to "events" whose occurrence or failure to occur is random. Two crucial concepts in the theory of probability are those of a random variable and of the probability distribution of a random variable.

Implementing the features described above with affordable instruments requires reliable real-time estimates of system state. Unfortunately, the complete state is not always observable. State Estimation takes all the data obtained and uses it to determine the underlying behavior of the system at any point in time. It includes fault detection, isolation and continuous system state estimation.

There are two parts to state estimation: modeling and algorithms. The overall approach is to use a model to predict the behavior of the system in a particular state, and then compare that behavior with the actual measurements from the instruments to determine which state or states is the most likely to produce the observed system behavior.

This is not well understood or currently implemented in the construction industry; the approach understood and practiced is logical decisions in linear and deterministic systems. If use cases require higher confidences in measurements, instrument specifications are tightened resulting in the undesired effect of cost and schedule increases. The environment we live and operate in is neither linear nor deterministic; use cases are infinite; and the perverse variability of the systems and potential errors cannot be modeled. The variability of the problem identified above includes aspects other than just spatial (i.e. precise location of the tunnel boring machine); temporal relationships are part of the fundamental intellectual structure (together with space and number) within which events must be sequenced, quantify the duration of events, quantify the intervals between them, and compare the kinematics of objects.

In any of the embodiments listed above; the use of Fusion Engine (FE) and Kalman filters in the guidance system of the TBM, will greatly improve position accuracy and reduce instrument costs. The FE continuously receives measurements from multiple sources and generates a state estimate and covariance (confidence) of the current position of the TBM; all updated position data measurements received are used to ensure the measurement data is within the FE estimates.

In order to continuously and accurately estimate the position of the TBM the Kalman filters in the preferred embodiment are implemented as an asynchronous n-scalable Interacting Multiple Model (IMM) estimation Filter. The IMM comprises multiple models of drift from position in order to accurately match the maneuvering and drift expectations.

Since the drift or progression of the gyros in either FTINS is not known ahead of time, an accurate model cannot be designed, so errors in the position estimation will occur. Adding process noise to model the TBM maneuvers or using a maneuver detector to adapt the filter has been used in the art, but detection delays and large estimation errors during maneuvers are still a problem. It is generally accepted that the Interacting Multiple Model (IMM) estimator provides superior tracking performance compared to a single Kalman Filter.

The IMM is based on using several models in parallel to estimate the maneuvering TBM's states. Each Kalman Filter, uses a different model for each maneuver, one models a constant state of the TBM, another models a position change in the longitudinal axis while another models a position change in the lateral axis and vertical axis. Switching between these models during each sample period is determined probabilistically. Unlike maneuver detection systems where only one filter model is used at a time, the IMM uses all filters. The overall state estimate output is a weighted combination of the estimates from the individual filters. The weighting is based on the likelihood that a filter model is the correct maneuvering TBM model.

The IMM estimator is a state estimation algorithm that uses Markovian switching coefficients. A system with these coefficients is described by r models, $M^1, M^2, \ldots, M^r$, and given probabilities of switching between these models. $M^j(k)$ denotes that model j ($M^j$) is in effect during the sampling period ending at time $t_k$, $[t_{k-1}, t_k]$. The dynamics and measurement for a linear system are given by $$x(k) = \Phi^j(k,k-1)x(k-1) + G^j(k,k-1)w^j(k-1), \quad (1)$$

and $$z(k) = H^j(k)x(k) + v^j(k), \quad (2)$$

where x(k) is the system state at time $t_k$, z(k) is the measurement vector at time $t_k$, $\Phi^j(k,k-1)$ is the state-transition matrix from time $t_{k-1}$ to time $t_k$ for $M^j(k)$, $G^j(k,k-1)$ is the noise input matrix, and $H^j(k)$ is the observation matrix for $M^j(k)$. The process noise vector $w^j(k-1)$ and the measurement noise vector $v^j(k)$ are mutually uncorrelated zero-mean white Gaussian processes with covariance matrices $Q^j(k-1)$ and $R^j(k)$ respectively.

The initial conditions for the system state under each model j are Gaussian random variables with mean $\bar{x}^j(0)$ and covariance $P^j(0)$. These prior statistics are assumed known, as also is $\mu^j(0)=Pr\{M^j(0)\}$, which is the initial probability of model j at $t_0$.

The model switching is governed by a finite-state Markov chain according to the probability $\pi_{ij}=Pr\{M^j(k)|M^i(k-1)\}$ of switching from $M^i(k-1)$ to $M^j(k)$. The model switching probabilities, $\pi_{ij}$, are assumed known and an example is $$\pi_{ij} = \begin{bmatrix} .95 & .05 \\ .05 & .95 \end{bmatrix}. \quad (3)$$

Figure 17:
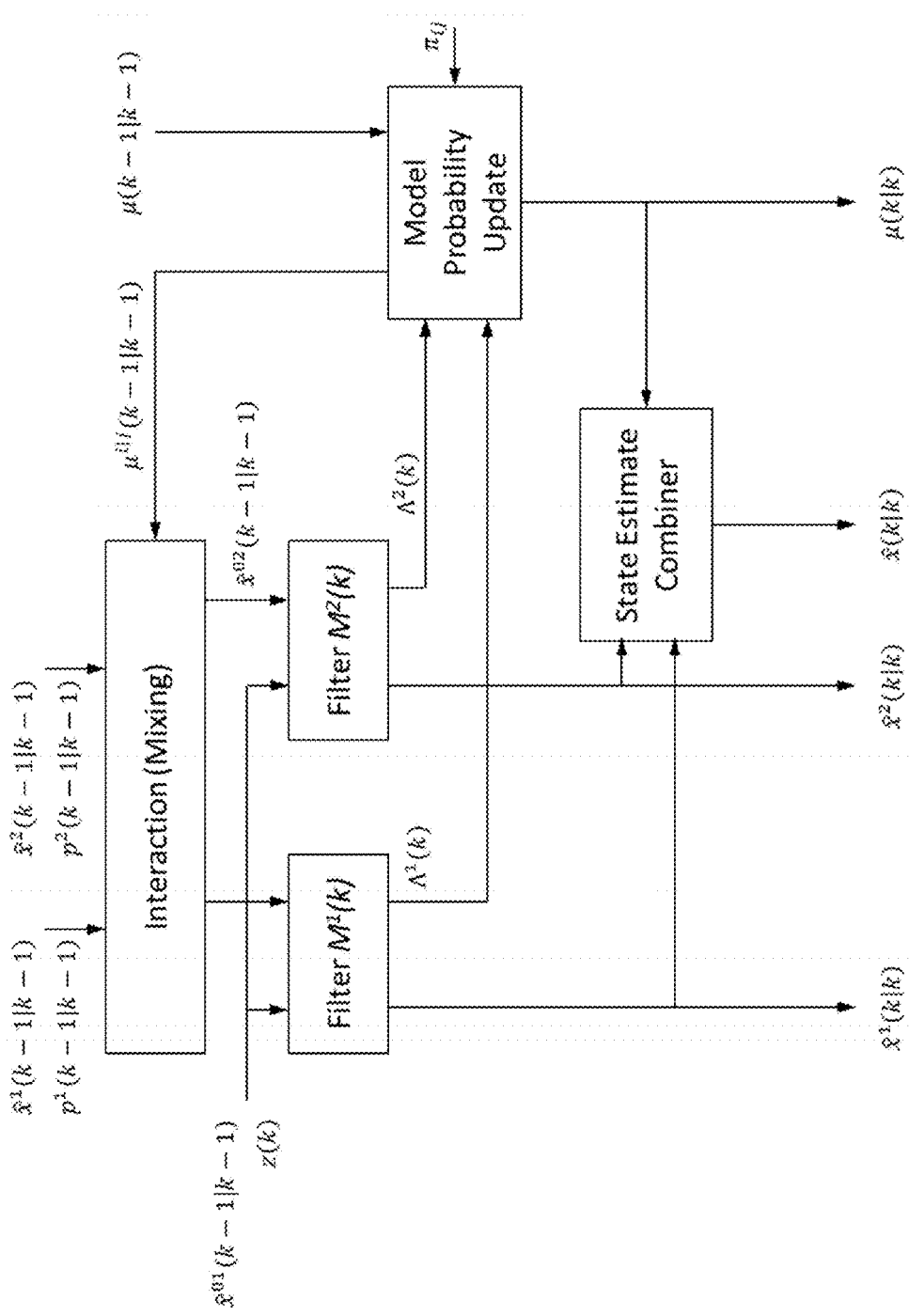
FIG. 17 is a block diagram of the SACore IMM for Automatic Guidance of a TBM.

A block diagram of the IMM estimator with only two models, for simplicity, is shown in FIG. 17.

The inputs to the IMM estimator are $\hat{x}^1(k-1|k-1)$, $\hat{x}^2(k-1|k-1)$, $P^1(k-1|k-1)$, $P^2(k-1|k-1)$, and $\mu^{i|j}(k-1|k-1)$, all from the sampling period ending at $t_{k-1}$. Where $\hat{x}^1(k-1|k-1)$ is the state estimate from filter 1 at time $t_{k-1}$ using measurements from time $t_{k-1}$ and $P^1(k-1|k-1)$ is the corresponding state covariance matrix. Each of the filters use a different mixture of $\hat{x}^1(k-1|k-1)$ and $\hat{x}^2(k-1|k-1)$ for their input. For r models, this mixing allows the model-conditioned estimates in the current cycle to be computed using r filters rather than $r^2$ filters, which greatly decreases the computational burden. The inputs to the filters, $\hat{x}^{01}(k-1|k-1)$, $\hat{x}^{02}(k-1|k-1)$, and the corresponding covariance matrices are computed in the Interaction (Mixing) block.

For the filter matched to $M^j(k)$, the inputs are $$\hat{x}^{0j}(k-1|k-1) = \sum_{i=1}^{r} \mu^{i|j}(k-1|k-1)\hat{x}^i(k-1|k-1) \quad (4)$$

$$P^{0j}(k-1|k-1) = \sum_{i=1}^{r} \mu^{i|j}(k-1|k-1)$$
$$\{P^i(k-1|k-1) + [\hat{x}^i(k-1|k-1) - \hat{x}^{0j}(k-1|k-1)]^*$$
$$[\hat{x}^i(k-1|k-1) - \hat{x}^{0j}(k-1|k-1)]^T\}, \quad (5)$$

where the conditional model probability is $$\mu^{i|j}(k-1|k-1) = Pr\{M^i(k-1)|M^j(k), Z_1^{k-1}\} \quad (6)$$
$$= \frac{1}{\mu^j(k|k-1)}\pi_{ij}\mu^i(k-1|k-1),$$

and the predicted model probability is $$\mu^j(k|k-1) = Pr\{M^j(k)|Z_1^{k-1}\} = \sum_{i=1}^{r} \pi_{ij}\mu^i(k-1|k-1). \quad (7)$$

Using the measurements, z(k), for the filter matched to $M^j(k)$, the updates are computed using the familiar Kalman Filter equations $$\hat{x}^j(k|k-1)=\Phi^j(k,k-1)\hat{x}^{0j}(k|k-1), \quad (8)$$

$$P^j(k|k-1)=\Phi^j(k,k-1)P^{0j}(k|k-1)[\Phi^j(k,k-1)]^T+G^j(k,k-1)$$
$$Q^j(k-1)[G^j(k,k-1)]^T, \quad (9)$$

$$v^j(k)=z(k)-H^j(k)\hat{x}^j(k|k-1), \quad (10)$$

$$S^j(k)=H^j(k)P^j(k|k-1)[H^j(k)]^T+R^j(k), \quad (11)$$

$$K^j(k)=P^j(k|k-1)[H^j(k)]^T[S^j(k)]^{-1}, \quad (12)$$

$$\hat{x}^j(k|k)=\hat{x}^j(k|k-1)+K^j(k)v^j(k), \quad (13)$$

$$P^j(k|k)=[I-K^j(k)H^j(k)]P^j(k|k-1), \quad (14)$$

where $\hat{x}^j(k|k-1)$ is the predicted state estimate under $M^j(k)$, $P^j(k|k-1)$ is the corresponding prediction covariance, $v^j(k)$ is the residual, $S^j(k)$ is the residual covariance matrix, $K^j(k)$ is the Kalman gain matrix, $X^j(k|k)$ is the updated state estimate under $M^j(k)$, and $P^j(k|k)$ is the updated covariance matrix.

The likelihood of the filter matched to $M^j(k)$ is defined by $\Lambda^j(k)=f[z(k)|M^j(k), Z_1^{k-1}]$, where $f[\bullet|\bullet]$ denotes a conditional density. Using the assumption of Gaussian statistics, the filter residual and the residual covariance, the likelihood is $$\Lambda^j(k) = \frac{1}{\sqrt{\det[2\pi S^j(k)]}} \exp\left\{-\frac{1}{2}[v^j(k)]^T[S^j(k)]^{-1}v^j(k)\right\}. \quad (15)$$

The probability for $M^j(k)$ is $$\mu^j(k|k) = Pr\{M^j(k)|Z_1^k\} = \frac{1}{c}\mu^j(k|k-1)\Lambda^j(k), \quad (16)$$

where the normalization factor c is $$c = \sum_{j=1}^{r} \mu^i(k|k-1)\Lambda^i(k). \quad (17)$$

These computations are performed in the Model Probability Update block. Finally the combined state estimate $\hat{x}(k|k)$ and the corresponding state error covariance for the IMM are given by $$\hat{x}(k|k) = \sum_{j=1}^{r} \mu^j(k|k)\hat{x}^j(k|k), \quad (18)$$

$$P(k|k) = \sum_{j=1}^{r} \mu^j(k|k)\{P^j(k|k) + [\hat{x}^j(k|k) - \hat{x}(k|k)][\hat{x}^j(k|k) - \hat{x}(k|k)]^T\}. \quad (19)$$

The final state estimate, $\hat{x}(k|k)$, is the best estimate of the TBM state and P(k|k) is the error covariance matrix for this optimal state estimate.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The embodiments of the invention in which an exclusive property or privilege is claimed are defined as follows:

1. A dynamic geo-location and mapping system for a tunnel boring machine (TBM) used to determine deviation from a design centerline of a tunnel to the TBM, generate a position update for the TBM guidance system and generate a three-dimensional plan of the tunnel as built, the system comprising:
    a TBM;
    a first Inertial Navigation System (INS) mounted on a vehicle, wherein the vehicle is configured to service the TBM;
    position determining systems located proximate to a launch pit configured to transmit positioning data for initialization of the first INS for obtaining an accurate current position of the vehicle;
    a ranging device mounted on the vehicle to make measurements orthogonal to the geometric centerline of the tunnel;
    a first memory located on the vehicle;
    a first computer located on the vehicle, wherein the first computer is configured to collect data as the vehicle traverses the tunnel;
    responsive to traversing the tunnel for data collection, logging data in the first memory, arrive at a known and predetermined location with the TBM, and transmit the logged data to the TBM;
    a second INS located on the TBM;
    a second memory located on the TBM;
    a second computer located on the TBM configured to receive the logged data from the first computer, receive an updated position of the first INS, translate the first INS position to the second INS as a position update and determine real-time parametric guidance information for the TBM to at least one of maintain a current path and course correct to the design centerline of the tunnel.

2. A dynamic geo-location and mapping method for a tunnel boring machine (TBM) used to determine deviation of the TBM centerline from a tunnel flail design centerline, generate a position update for the TBM guidance system and generate a three-dimensional plan of the tunnel as built, the method comprising:
    operating a TBM;
    operating a first Inertial Navigation System (INS) mounted on a vehicle, wherein the vehicle is configured to service the TBM;
        transmitting positioning data for initialization of the first INS for obtaining an accurate initial position of the vehicle using position determining systems proximate to a launch pit;
        operating a ranging device mounted on the vehicle to make measurements orthogonal to the design centerline of the tunnel;
        using a first memory located on the vehicle;
        operating a first computer located on the vehicle, wherein the first computer is configured to collect data as the vehicle traverses the tunnel;
        responsive to traversing the tunnel for data collection, logging the data in the first memory, arriving at a known and predetermined location in relation to the TBM, and transmitting the logged data to the TBM;
    operating a second INS located on the TBM;
    using a second memory located on the TBM;
    operating a second computer located on the TBM configured to receive the logged data from the first computer, receive an updated position of the first INS, translate the first INS position to the second INS as a position update and determine real-time parametric guidance information for the TBM to at least one of maintain a path and course correct to the design centerline of the tunnel.

3. A dynamic geo-location and mapping system for a tunnel boring machine (TBM) used to determine deviation from a design centerline of a tunnel to the TBM, generate a position update for the TBM guidance system, and generate a three-dimensional plan of the tunnel as built, the system comprising:
    a TBM;
    one or more position determining systems located proximate to a launch pit, wherein the launch pit is the starting point of a tunnel to be bored, and wherein the one or more position determining systems determines a location from a satellite array;
    a position transmitter located on each position determining system configured to generate a position signal comprising at least two elements, the first element is a coded message, wherein the coded message is position data, and the second element is an RF carrier, wherein the RF carrier is one of narrowband, spread spectrum, and ultra-wideband;
    a vehicle configured to service the TBM;
    a position receiver located on the vehicle, configured to receive the position signal from the position determining systems;
    a data transmitter located on the vehicle and configured to transmit data off the vehicle;
    a first inertial navigation system (INS) located on the vehicle;
    a ranging device mounted on the vehicle to make measurements orthogonal to the geometric centerline of the tunnel;
    a vehicle computer located on the vehicle, wherein the vehicle computer is connected to the position receiver, the data transmitter, the INS, and the ranging device, wherein the vehicle computer comprises a first memory for logging data, and wherein the vehicle computer is configured to:
        receive the position signal and the station identification from each of the position determining systems located proximate to the launch pit,
        receive the modulated signals and the station identification from each of the one or more position determining systems,
        responsive to receiving the position signal associate the position data from each position determining system to determine a position of the vehicle,
        responsive to determining the position of the vehicle, send the position to the first INS and initialize the first INS,
        use the data transmitter located on the vehicle to transmit a first status ready message to at least one of a control station located proximate to the launch pit and an operator of the vehicle, responsive to receiving the status ready message, release the vehicle to traverse the tunnel for collecting time stamped data from the first INS and the ranging device and log the data collected, responsive to traversing the tunnel for data collection and arriving at a known and predetermined location relative to the TBM, transmit from the data transmitter a current position obtained from the first INS;

a TBM transmitter connected to a TBM computer located on the TBM, wherein the TBM computer comprises a second memory, and wherein the TBM computer is configured to:

receive the current position of the first INS from the data transmitter, responsive to receiving the current position data, determine the offset between the first INS and the second INS, apply a course correction to the current position data, and update the second INS with the current position and the required course correction, responsive to updating the second INS, download the logged data from the first memory to the second memory in the TBM computer, responsive to downloading the logged data, send a second status ready message to the vehicle computer for release to traverse the tunnel back to the launch pit.

* * * * *